US008824591B2

(12) United States Patent
Wilson et al.

(10) Patent No.: US 8,824,591 B2
(45) Date of Patent: Sep. 2, 2014

(54) DIGITAL RADIO FREQUENCY CLOCKING METHODS

(71) Applicant: LSI Corporation, Milpitas, CA (US)

(72) Inventors: Ross S. Wilson, Menlo Park, CA (US);
Said E. Abdelli, Minneapolis, MN (US);
Peter Kiss, Basking Ridge, NJ (US);
Donald R. Laturell, Oak Hill, FL (US);
James F. MacDonald, Stillwater, MN (US)

(73) Assignee: LSI Corporation, San Jose, CA (US)

( * ) Notice: Subject to any disclaimer, the term of this patent is extended or adjusted under 35 U.S.C. 154(b) by 154 days.

(21) Appl. No.: 13/660,520

(22) Filed: Oct. 25, 2012

(65) Prior Publication Data
US 2014/0119470 A1    May 1, 2014

(51) Int. Cl.
*H04L 27/00*    (2006.01)

(52) U.S. Cl.
USPC .......................................... 375/295; 375/376

(58) Field of Classification Search
USPC ................................................ 375/295, 376
See application file for complete search history.

(56) References Cited

U.S. PATENT DOCUMENTS

| 6,118,314 A * | 9/2000 | Arnould et al. ............... 327/141 |
| 7,079,064 B1 * | 7/2006 | Bell et al. ...................... 341/144 |
| 7,752,477 B2 | 7/2010 | Otomo |

OTHER PUBLICATIONS

Harris, Fred, "Digital Signal Processing in Radio Receivers and Transmitters", International Journal of Wireless Information Networks, vol. 5, No. 2, 1998, 1998 Plenum Publishing Corporation, pp. 133-145.
Evangelista, Gennaro, "Design of Digital Systems for Arbitrary Sampling Rate Conversion"; pp. 1-8.
Reutemann, Robert, et al., A 4.5 mW/Gb/s 6.4 Gb/s 22+1-Lane Source Synchronous Receiver Core with Optional Cleanup PLL in 65 nm CMOS; IEEE Journal of Solid-State Circuits, vol. 45, No. 12, Dec. 2010, pp. 2850-2860, IEEE 2010.
Pasko, R., et al., "High-Performance Flexible All-Digital Quadrature Up and Down Converter Chip"; IEEE 2000 Custom Integrated Circuits Conference, pp. 43-46, IEEE 2000.

* cited by examiner

*Primary Examiner* — Shuwang Liu
*Assistant Examiner* — Nader Bolourchi
(74) *Attorney, Agent, or Firm* — Suiter Swantz pc llo

(57) ABSTRACT

A method and system for synchronous transfer of bitstream data between a power-driver chip and a digital signal processing chip in a digital radio frequency transmit system is disclosed. A master phase-locked-loop located in the power-driver chip is utilized to provide master clocking control for the digital radio frequency transmit system. Furthermore, the clocking method and system is configurable to secure precise carrier frequency positioning of a digitally-generated radio frequency signal based on predetermined chip frequencies unrelated to the carrier frequency, assuring low bitstream phase noise at the output of the power driver chip.

20 Claims, 5 Drawing Sheets

DIGITAL RADIO FREQUENCY CLOCKING METHODS

TECHNICAL FIELD

The present invention relates to the field of digital radio frequency (RF) systems and particularly to methods for securing precise carrier frequency positioning of a digitally-generated RF signal.

BACKGROUND

In communication systems, a chip refers to a pulse of a code, and the chip rate of a code is the number of pulses per second (chips per second) at which the code is transmitted or received. In wireless communication systems, chip rate and carrier frequency are independent and set to precise values by relevant standards. In traditional analog-based transmitters, chip and carrier frequencies are decoupled. This decoupling is not problematic as up-mixing of the baseband signal in the RF chain translates the signal to a carrier frequency.

However, in digital RF systems employing noise-shaped modulators (e.g., bitstream generators or the like), the carrier frequency is related to the clock frequency of the modulator. Therein lies the need to provide methods for securing precise carrier frequency positioning of a digitally-generated RF signal.

SUMMARY

Accordingly, an embodiment of the present disclosure is directed to a digital radio frequency transmit system. The system includes a digital signal processing unit having at least a digital upconvertor and a bitstream generator. The system also includes a digital predriver communicatively coupled with the digital signal processing unit. The digital predriver configured for receiving the digital pulse stream from the bitstream generator and providing an output to a switch-mode power amplifier. The clocking in the system is controlled by a master phase-locked-loop (PLL) located in the digital predriver. The master PLL is configured for providing: a bitstream frequency $F_{bitstream}$ for clocking control within the digital predriver; and a reference signal $F_{chip\_ref}$ for synchronizing clocking control between the digital predriver and the digital signal processing unit. A local phase-locked-loop (PLL) located in the digital signal processing unit is configured for receiving the reference signal $F_{chip\_ref}$ from the master PLL and providing clocking control within the digital signal processing unit at least partially based on the reference signal $F_{chip\_ref}$ received.

A further embodiment of the present disclosure is also directed to a digital radio frequency transmit system. The system includes a digital upconvertor configured for performing carrier aggregation of multiple complex baseband channels and providing an aggregated baseband signal, wherein clocking of the digital upconvertor is controlled based on a chip rate $F_{chip}$. The system also includes a bitstream generator configured for encoding the aggregated baseband signal into a digital pulse stream, wherein clocking of the bitstream generator is controlled based on a carrier frequency $F_{carrier}$. A clock interpolator in communication with the digital upconvertor and the bitstream generator is configured for receiving clocking control signals for both the digital upconvertor and the bitstream generator, and maintaining synchronous transfer of the aggregated baseband signal from the digital upconvertor to the bitstream generator.

An additional embodiment of the present disclosure is directed to a clocking method for a digital radio frequency transmit system. The clocking method include: 1) utilizing a master PLL located in a digital predriver to provide master clocking control for the digital radio frequency transmit system, the master PLL being a low-phase-noise PLL configured for providing: a bitstream frequency $F_{bitstream}$ for clocking control within the digital predriver; and a reference signal $F_{chip\_ref}$ for synchronizing clocking control between the digital predriver and a digital signal processing unit; 2) receiving the reference signal $F_{chip\_ref}$ at a local PLL located in the digital signal processing unit; and 3) utilizing the local PLL to provide clocking control within the digital signal processing unit at least partially based on the reference signal $F_{chip\_ref}$ received.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
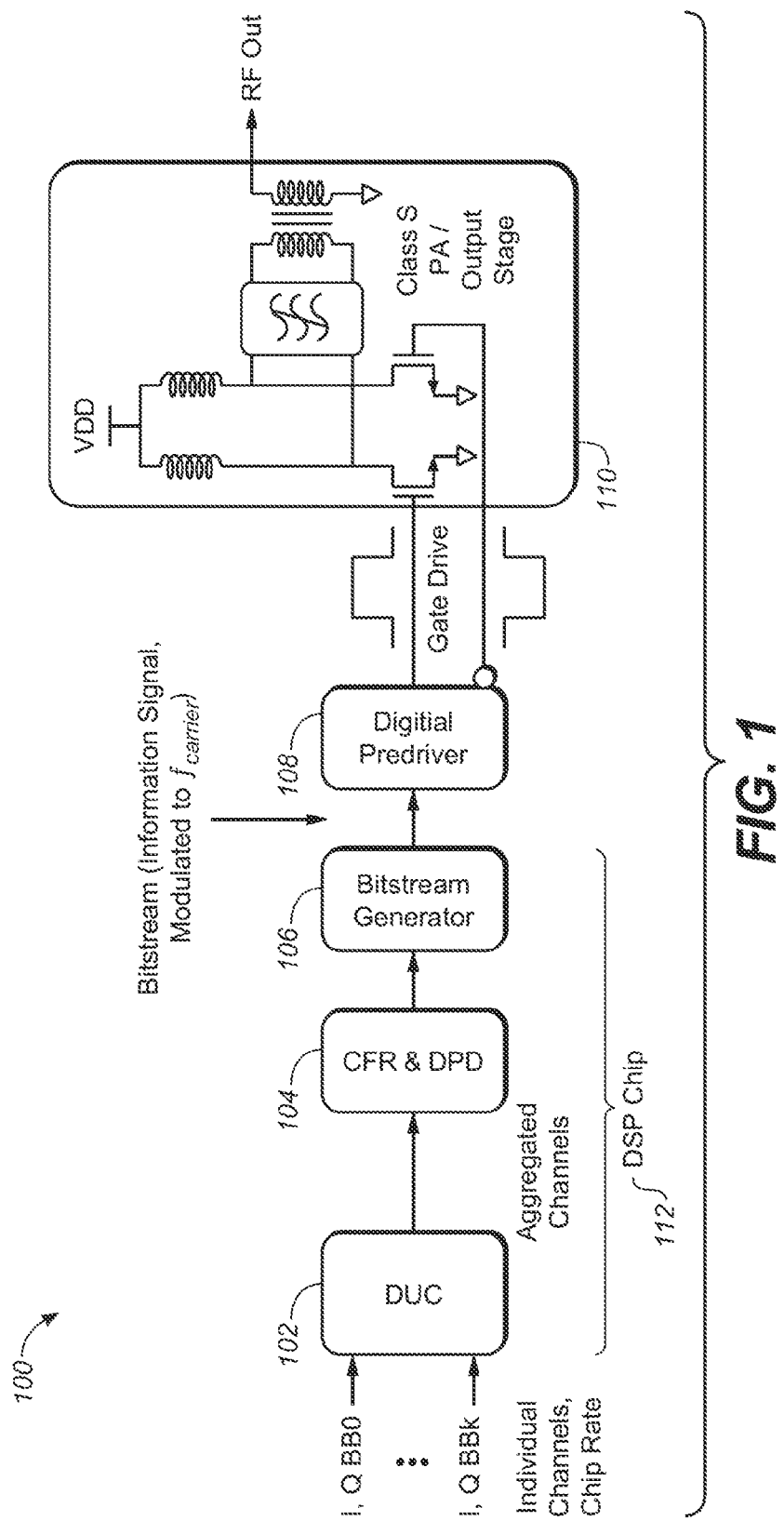
FIG. 1 is a block diagram illustrating a digital RF transmit system that utilizes a switch-mode power amplifier.

FIG. 1 is a block diagram illustrating a typical digital RF transmit system 100 that utilizes a switch-mode power amplifier. Carrier aggregation of multiple complex baseband channels is performed in the Digital Upconvertor (DUC) block 102, followed by Crest Factor Reduction (CFR) and Digital Predistortion (DPD) operations 104 employed to maximize RF Power Amplifier (PA) efficiency and to reduce distortion in the RF output signal. The bitstream generator 106, which may be implemented as a bandpass sigma-delta convertor or Viterbi-based optimal-pulse-sequence unit, encodes an aggregated input baseband signal into a digital pulse stream in which the baseband signal is shifted to the desired carrier frequency $F_{carrier}$. The encoding process also shapes the single-bit quantization noise power, pushing it away from the vicinity of the carrier frequency $F_{carrier}$. In a bandpass-type noise-shaped modulator, the clock frequency is generally set to ~4×$F_{carrier}$ as a compromise between high oversampling factor (e.g., <~0.9 dB zero-order hold loss in the power amplifier output stage) and switching losses in the output stage. It is contemplated that blocks 102, 104 and 106 may be fabricated on to a chip jointly referred to as a digital signal processing (DSP) chip 112.

The resulting bitstream from the DSP 112 goes through a predriver 108, which prepares the signal for further amplification by a switch-mode PA such as a Class-S PA 110. The output of the switch-mode PA is bandpass filtered to recover the modulated RF signal and to eliminate out-band quantization noise. The RF output signal may then be applied directly to an antenna after passage through a transmit/receive duplexer, or to a subsequent high-power amplifier stage in situations where high transmit power is required (e.g., in the greater than ~10 watt range). It is contemplated that while a current-mode power amplifier 110 is depicted in this exemplary embodiment, other types of power amplifiers such as voltage-mode power amplifiers or the like may also be utilized without departing from the spirit and scope of the present disclosure.

In digital RF transmit systems such as system 100 described above, the carrier frequency is related to the clock frequency of the modulator, and therein lies the need to secure precise carrier frequency positioning of a digitally-generated RF signal. The present disclosure is directed to a method and system for synchronous transfer of bitstream data between a power-driver chip and a digital signal processing (DSP) chip that embodies a bitstream generator and baseband-processing functions. Furthermore, the method and system may be configured for securing precise carrier frequency positioning of a digitally-generated RF signal based on predetermined chip frequencies unrelated to the carrier frequency. The method and system in accordance with the present disclosure assures low bitstream phase noise at the output of the power driver chip.

More specifically, it is noted that logic complexity of the bitstream generator demands that it be fabricated on a fine-line CMOS process or the like. Similarly, voltage swing requirements of the output driver chip require use of an appropriate technology such as silicon-germanium BiCMOS. Transmission of the bitstream between these two chips inevitably introduces asymmetries and jitter. Thus, the present disclosure provides a mechanism to resynchronize the bitstream in the predriver to a low-phase-noise master clock.

Figure 2:
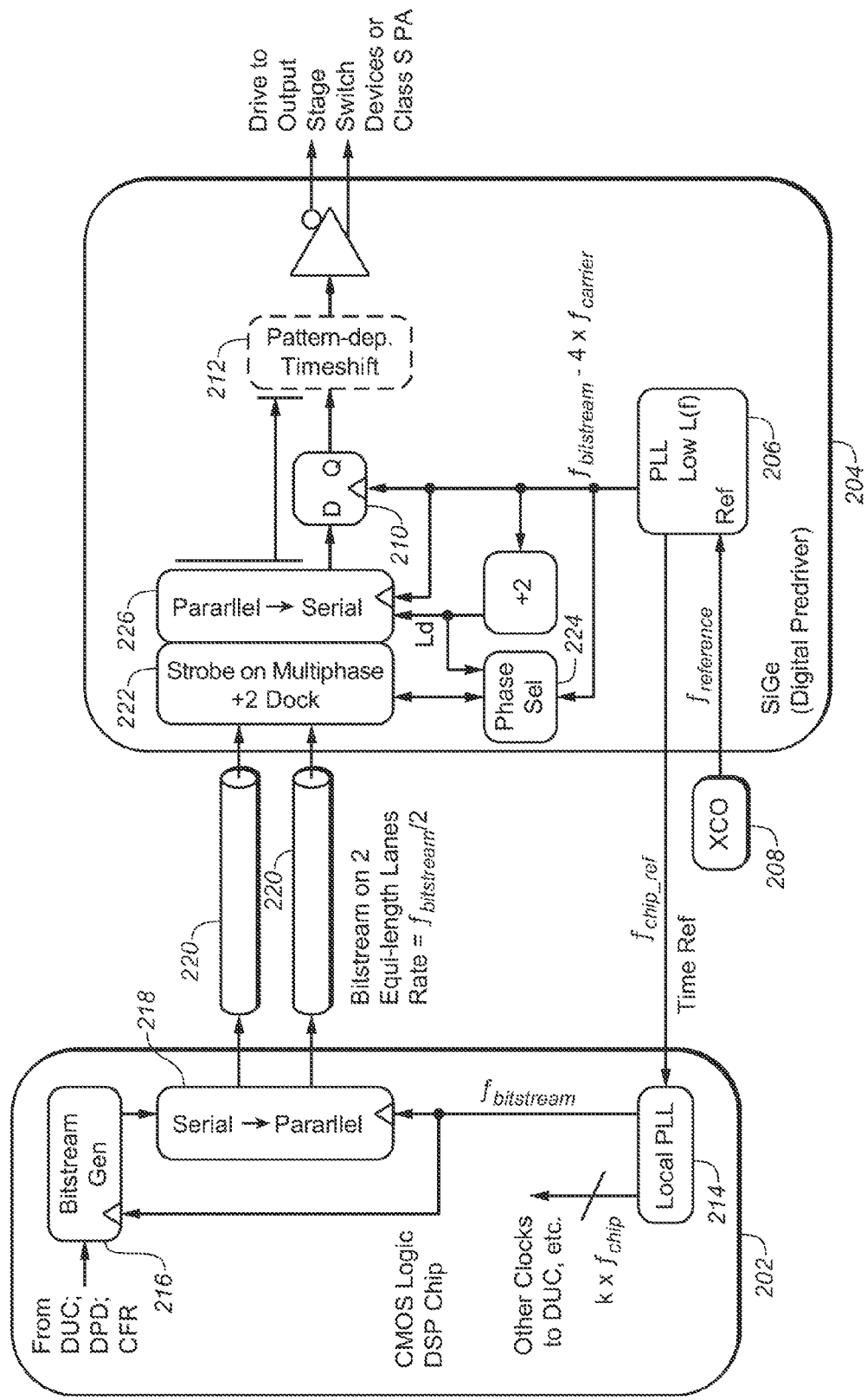
FIG. 2 is a block diagram illustrating low-phase-noise resynchronization of a bitstream received from a bitstream generator.

Referring now to FIG. 2, a block diagram illustrating low-phase-noise resynchronization of a bitstream received from a bitstream generator is shown. Overall system clocking is controlled by a low-phase-noise master phase-locked-loop (PLL) 206 located in the predriver chip 204. In one embodiment, the PLL 206 is configured to receive its reference $F_{reference}$ from an external low-phase-noise crystal-controlled oscillator (XCO) 208 and synthesizes an output frequency $$F_{bitstream} = \frac{M}{N} \times F_{reference} \cdot \frac{M}{N}$$

in this equation represents a ratio determined based on the desired bitstream frequency (which is a predetermined value based on the carrier frequency $F_{carrier}$) and the reference frequency from the XCO 208. For instance, if the desired bitstream frequency is known to be 2 GHz and the reference frequency from the XCO 208 is 200 MHz, the values of $$\frac{M}{N} \text{ is } \frac{2 \text{ GHz}}{200 \text{ MHz}} = 10.$$

It is contemplated, however, that synthesis techniques such as fractional-N frequency synthesis or the like may also be utilized for obtaining the output frequency $F_{bitstream}$ without departing from the spirit and scope of the present disclosure, as long as the overall system clocking is controlled by a PLL/synthesizer located in the predriver chip 204.

In accordance with the present disclosure, the synthesized output frequency $F_{bitstream}$ provided by the PLL/synthesizer 206 is used for precise clocking control in the predriver chip 204. In one embodiment, the synthesized output frequency $F_{bitstream}$ provided by the synthesizer 206 is received by a D flip-flop 210 (also known as a data or delay flip-flop). The D flip-flop is clocked by the output frequency $F_{bitstream}$ of the synthesizer 206 and is utilized to resynchronize the bitstream before providing the bitstream to the switch-mode PA 110 described above.

It is contemplated that an optional pattern-dependent time-shift block 212 is interposed between the D flip-flop 210 and the predriver output if the switch-mode PA 110 is a Class-S PA. The pattern-dependent time shift block 212 in this embodiment is configured to impart fractional-clock-period edge timeshifts to compensate for context-dependent switching effects in the Class-S PA. Operationally, bitstream patterns can be examined in a lookback/lookforward window and the result can be used to vary bitstream edge times.

In addition to providing output frequency $F_{bitstream}$ to the D flip-flop 210, the synthesizer 206 is also configured to provide a second output, $F_{chip\_ref}$, to the DSP chip 202. The second output $F_{chip\_ref}$ is utilized to synchronize clocking control between the predriver chip 204 and the DSP chip 202. More specifically, the DSP chip 202 is clocked by the PLL/synthesizer 206 (may be referred to as the master PLL) located in the predriver chip 204. Upon receiving the $F_{chip\_ref}$ a local PLL 214 within the DSP chip 202 is utilized to generate all required DSP clocks, including a phase-coherent clock at $F_{bitstream}$, to control the bitstream generator 216 and an associated parallelizing register 218.

In one embodiment, the local PLL 214 is implemented as a digital PLL with a ring-type oscillator. While a ring-type oscillator is generally easier to design and more cost effective, it generally has phase noise inadequate for wireless transmission. However, by allowing the DSP chip 202 to be clocked by the low-phase-noise PLL/synthesizer 206 located in the predriver chip 204 in accordance with the present disclosure, the precision requirement and the complexity of the local PLL 214 in the DSP chip 202 is reduced, and therefore a digital PLL with a ring-type oscillator is sufficient to satisfy the phase noise requirement of the overall system. It is contemplated, however, that the local PLL 214 may also be implemented utilizing various other technologies without departing from the spirit and scope of the present disclosure.

It is also contemplated that the bitstream generator's serial binary output possesses a transition rate of nominally (but not necessarily equal to) $F_{bitstream}$~4×$F_{carrier}$. For instance, in typical cellular systems, $F_{carrier}$~2.14 GHz, implying a transition rate $F_{bitstream}$~8.56 Gtrans/s. In order to eliminate the need for equalization and precise strobing in the predriver chip 204, the bitstream is preferably (but is not required to be) parallelized into i parallel lanes. In the exemplary embodiment depicted in FIG. 2, the bitstream is parallelized into two parallel equi-length lanes 220 (i.e., i=2) each having a rate that is $$\frac{F_{bitstream}}{2}.$$

It is contemplated that differential Positive Emitter-Coupled Logic (PECL) is a suitable signaling technology to implement such a parallel bitstream configuration.

At the receiving end of the bitstream lanes 220 in the predriver 204, each inbound lane is applied to the D input of n flip-flops 222. The purpose of utilizing n flip-flops 222 for each inbound lane 220 is to provide n different possible candidate output each with a different adjustable delay. The phase selector circuit 224 then selects among the candidates one that is closest to the middle, essentially providing a sample-centering process on the receiving end for each inbound lane. In one embodiment, each of the n flip-flops 222 associated with a particular inbound lane is clocked by $$\frac{360°}{n}-$$

phase of $$\frac{F_{bitstream}}{i}.$$

The phase selector circuit 224 is utilized to monitor the flip-flop outputs and determine which two flip-flops have dissimilar outputs. The phase selector circuit 224 then chooses for passage to a 2-bit parallel-to-serial register 226 the output of that flip-flop midway between the flip-flops bracketing the transition point.

It is contemplated that other sample-centering techniques may also be utilized. For example, use of a variable delay in each lane may provide sample-centering abilities without departing from the spirit and scope of the present disclosure. Furthermore, alternative to use of a lane-specific variable delay, it is possible to sample each lane using a flip-flop having a variable clock phase created by interpolation between multiple clock phases existing within PLL 206. It is also contemplated that once a phase selection has been made, it is possible to freeze the selection in order to reduce computation complexity for subsequent communications. In one embodiment, a register bit controlled by an external microprocessor is utilized to freeze the phase selection.

It is further contemplated that since the propagation delay between the DSP 202 and the predriver chip 204 may be sufficiently constant, only occasional update of strobe-point selection may be necessary. Therefore, instead of performing the resynchronization process in for every transition, an alternative approach simplifies the predriver and the programmable delays in the CMOS chip to accomplish strobe centering to a fixed strobe-time in the predriver chip. In one embodiment, the resynchronization process is invoked once for every predetermined number of transitions. In an alternative embodiment, the resynchronization process is invoked once every predetermined time interval (e.g., every millisecond).

Figure 3:
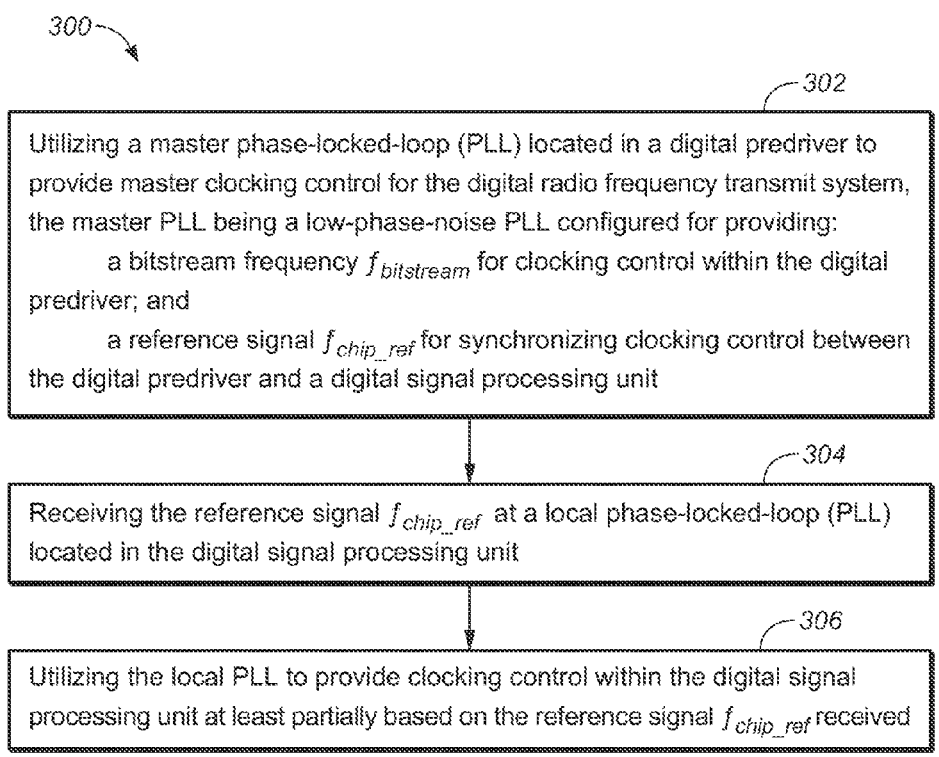
FIG. 3 is a flow diagram illustrating a clocking method for a digital radio frequency transmit system in accordance with the present disclosure.

FIG. 3 is a flow diagram illustrating the clocking method for a digital radio frequency transmit system in accordance with the present disclosure. Step 302 utilizes a master PLL located in the digital predriver to provide master clocking control for the digital radio frequency transmit system. As described above, the master PLL may be implemented using a low-phase-noise PLL configured for providing: a bitstream frequency $F_{bitstream}$ for clocking control within the digital predriver; and a reference signal $F_{chip\_ref}$ for synchronizing clocking control between the digital predriver and a digital signal processing unit. Upon receiving the reference signal $F_{chip\_ref}$ at a local PLL located in the digital signal processing unit in step 304, step 306 then utilizes the local PLL to provide clocking control within the digital signal processing unit at least partially based on the reference signal $F_{chip\_ref}$ received, as previously described.

Figure 4:
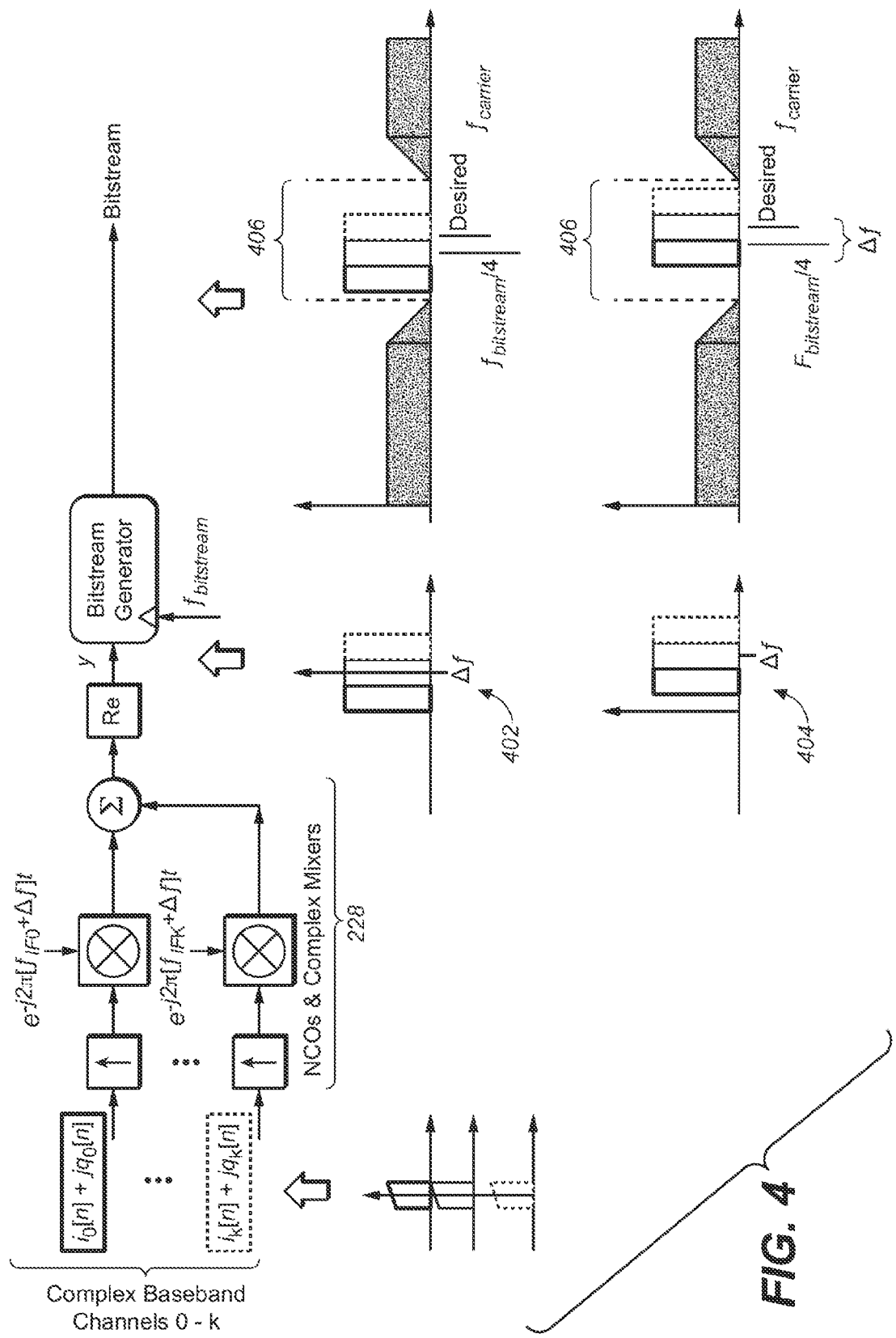
FIG. 4 is an illustration depicting a frequency offset for shifting upconverted baseband channels within a noise null.

In addition to providing the ability to resynchronize the bitstream as described above, the present disclosure also supports coherent clocking throughout the digital RF transmitter. This is achieved by allowing $F_{bitstream}$ to be a multiple K of the chip rate $F_{chip}$. Referring now to FIG. 4, in which for illustrative purposes only positive frequencies are shown. Since $F_{bitstream}=K\times F_{chip}$, the center of the bitstream's noise null will occur at $$K\times\frac{F_{chip}}{4},$$

which may not necessarily coincide with the desired carrier frequency $F_{carrier}$.

Similar to conventional channel aggregation techniques, channel aggregation in the Digital Upconvertor (DUC) is achieved by multiplying the complex baseband signals by a complex frequency generated in a high-resolution Numerically-Controlled Oscillator (NCO) 228 and chosen to assign the baseband signals to desired frequency slots. Different from conventional channel aggregation techniques, a frequency offset Δf is introduced to the NCO setting to shift the upconverted aggregated signals within the noise null in accordance with the present disclosure. The introduction of the frequency offset Δf to the NCO setting allows the upconverted aggregated signals to be shifted within the noise null, so they are precisely centered at the desired $F_{carrier}$.

The effectiveness of the shifted upconverted aggregated signals is illustrated in FIG. 4. Unshifted upconverted aggregated signal 402 appears at the center of the bitstream's noise null 406, which does not necessarily coincide with the desired carrier frequency. With the introduction of the frequency offset Δf, the shifted upconverted aggregated signal 404 no longer appears at the center of the bitstream's noise null 406, but coincides with the desired Fcarrier. As a further consequence, the location of the desired carrier frequency may not occupy the exact center of the noise null. In many cases, this is inconsequential. However, if determined to be problematic, the width of the noise null 406 may be increased to gain additional margin in noise-removal bandpass filter design.

Utilizing the frequency offset Δf in this manner increases the freedom for circuit design while still providing precise centering of the upconverted aggregated signals at the desired $F_{carrier}$. It is contemplated that the specific value of the frequency offset Δf may be determined for each design based on timing analysis of that particular design.

It is also contemplated that the clocking schemes described in the present disclosure are not limited to new digital RF systems. That is, in cases where the bitstream generator and subsequent digital RF circuitry are to be added to an existing wireless base station, a clocking scheme that supports two independent clock domains can be utilized to secure precise carrier frequency positioning.

Figure 5:
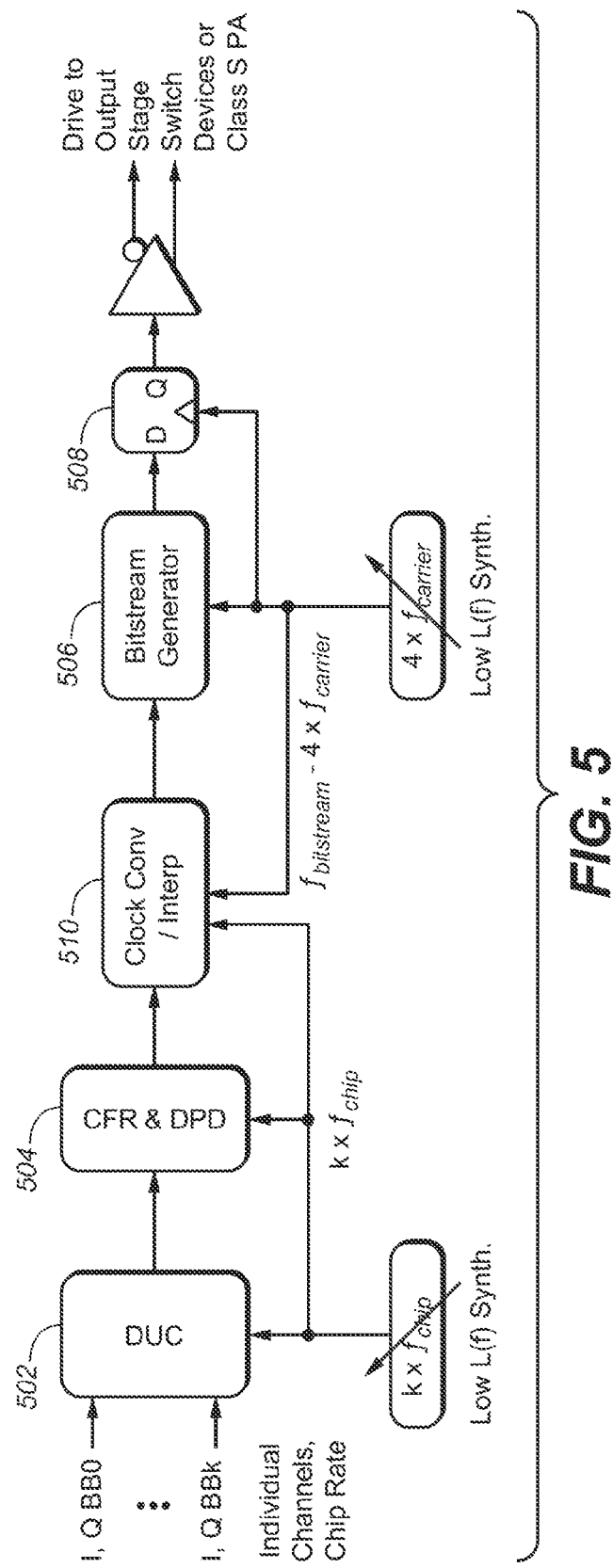
FIG. 5 is a block diagram illustrating a digital RF clocking scheme.

Referring now to FIG. 5, a block diagram illustrating a digital RF clocking scheme 500 is shown. The clocking scheme 500 supports two independent clock domains: one clock domain is related to the chip rate $F_{chip}$, which controls the DUC 502 and the CFR/DPD 504 operations, and the other clock domain is related to the carrier frequency $F_{carrier}$, which controls the bitstream generator 506 and the D flip-flop 508. In one embodiment, the bitstream generator 506 clock is selected exactly to equal $4 \times F_{carrier}$, and the same clock also controls the D flip-flop 508 to maintain synchronization of the bitstream before providing the bitstream to a switch-mode PA as previously described. Translation of the aggregated baseband signals occurs to an exact $F_{carrier}$ frequency, obviating the need for the frequency offset Δf in the DUC 502. In accordance with the present disclosure, a clock convertor/interpolator block 510 is utilized to interpolate the DUC output in the $F_{chip}$ domain and resample the DUC output in the $F_{carrier}$ domain to maintain precise clocking control across the two clock domains.

It is understood that, while the clock frequency used in the descriptions above is set to $4 \times F_{carrier}$, the clock frequency does not have to be limited to that configuration. Clock frequency that is n (greater than zero) times the carrier frequency may be utilized without departing from the spirit and scope of the present disclosure.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A digital radio frequency transmit system, comprising:
   a digital signal processing unit, the digital signal processing unit including at least: a digital upconvertor for performing carrier aggregation of multiple complex baseband channels, and a bitstream generator for encoding an aggregated signal into a digital pulse stream;
   a digital predriver communicatively coupled with the digital signal processing unit, the digital predriver configured for receiving the digital pulse stream from the bitstream generator and providing an output to a switch-mode power amplifier;
   a master phase-locked-loop (PLL) located in the digital predriver, the master PLL configured for providing:
   a bitstream frequency $F_{bitstream}$ for clocking control within the digital predriver; and
   a reference signal $F_{chip\_ref}$ for synchronizing clocking control between the digital predriver and the digital signal processing unit; and
   a local phase-locked-loop (PLL) located in the digital signal processing unit, the local PLL configured for receiving the reference signal $F_{chip\_ref}$ from the master PLL and providing clocking control within the digital signal processing unit at least partially based on the reference signal $F_{chip\_ref}$ received.

2. The digital radio frequency transmit system of claim 1, wherein the master PLL receives an externally produced reference frequency $F_{reference}$ and synthesizes the bitstream frequency $F_{bitstream}$ for clocking control within the digital predriver based on the externally produced reference frequency $F_{reference}$.

3. The digital radio frequency transmit system of claim 2, wherein the externally produced reference frequency $F_{reference}$ is produced utilizing a crystal-controlled oscillator.

4. The digital radio frequency transmit system of claim 1, wherein the local PLL receives the reference signal $F_{chip\_ref}$ from the master PLL and generates a bitstream frequency $F_{bitstream}$ for clocking control of the bitstream generator in the digital signal processing unit.

5. The digital radio frequency transmit system of claim 1, wherein the bitstream generator is configured for sending the digital pulse stream to the digital predriver utilizing i parallel lanes, each of the i parallel lanes having a rate equal to $$\frac{F_{bitstream}}{i}.$$

6. The digital radio frequency transmit system of claim 5, wherein the digital predriver includes:
   n D flip-flops for receiving each particular parallel lane of the i parallel lanes, each of the n D flip-flops corresponding to a particular parallel lane being clocked by $$\frac{360°}{n}$$

phase of $$\frac{F_{bitstream}}{i},$$

and the n D flip-flops corresponding to that particular parallel lane are configured for providing n possible candidate output each with a different adjustable delay;
   a phase selector circuit for selecting an output for each particular parallel lane of the i parallel lanes; and
   a D flip-flop for resynchronizing the selected output from each of the i parallel lanes and providing a resynchronized bitstream;
   wherein the bitstream frequency $F_{bitstream}$ provided by the master PLL is utilized for clocking control of the n D flip-flops corresponding to each of the i parallel lanes, the phase selector circuit and the D flip-flop for bitstream resynchronization.

7. The digital radio frequency transmit system of claim 6, wherein the bitstream generator is configured for sending the digital pulse stream to the digital predriver utilizing 2 parallel lanes, and each of the 2 parallel lanes corresponds to 8 D flip-flops located in the digital predriver.

8. The digital radio frequency transmit system of claim 1, wherein the aggregation of multiple complex baseband channels is performed by multiplying complex baseband signals by a complex frequency generated in a high-resolution Numerically-Controlled Oscillator and assigning the complex baseband signals to desired frequency slots, and wherein a frequency offset Δf is introduced to the Numerically-Controlled Oscillator to shift the upconverted aggregated baseband signal to coincide with a carrier frequency $F_{carrier}$.

9. A digital radio frequency transmit system, comprising:
   a digital upconvertor configured for performing carrier aggregation of multiple complex baseband channels and providing an aggregated baseband signal, wherein clocking of the digital upconvertor is controlled based on a chip rate $F_{chip}$;
a bitstream generator configured for encoding the aggregated baseband signal into a digital pulse stream, wherein clocking of the bitstream generator is controlled based on a carrier frequency $F_{carrier}$; and
a clock interpolator in communication with the digital upconvertor and the bitstream generator, the clock interpolator configured for receiving clocking control signals for both the digital upconvertor and the bitstream generator, and maintaining synchronous transfer of the aggregated baseband signal from the digital upconvertor to the bitstream generator.

10. The digital radio frequency transmit apparatus of claim 9, wherein the bitstream generator is clocked exactly to a multiple of the carrier frequency $F_{carrier}$ and the clock interpolator transfers the aggregated baseband signal received from the digital upconvertor to the bitstream generator exactly at the carrier frequency $F_{carrier}$.

11. The digital radio frequency transmit apparatus of claim 10, wherein the bitstream generator is clocked exactly to $4 \times F_{carrier}$.

12. A clocking method for a digital radio frequency transmit system, the method comprising:
utilizing a master phase-locked-loop (PLL) located in a digital predriver to provide master clocking control for the digital radio frequency transmit system, the master PLL being a low-phase-noise PLL configured for providing:
a bitstream frequency $F_{bitstream}$ for clocking control within the digital predriver; and
a reference signal $F_{chip\_ref}$ for synchronizing clocking control between the digital predriver and a digital signal processing unit;
receiving the reference signal $F_{chip\_ref}$ at a local phase-locked-loop (PLL) located in the digital signal processing unit; and
utilizing the local PLL to provide clocking control within the digital signal processing unit at least partially based on the reference signal $F_{chip\_ref}$ received.

13. The clocking method for a digital radio frequency transmit system of claim 12, wherein the master PLL receives an externally produced reference frequency $F_{reference}$ and synthesizes the bitstream frequency $F_{bitstream}$ for clocking control within the digital predriver based on the externally produced reference frequency $F_{reference}$.

14. The clocking method for a digital radio frequency transmit system of claim 13, wherein the externally produced reference frequency $F_{reference}$ is produced utilizing a crystal-controlled oscillator.

15. The clocking method for a digital radio frequency transmit system of claim 12, wherein the digital signal processing unit includes at least: a digital upconvertor for performing carrier aggregation of multiple complex baseband channels, and a bitstream generator for encoding an aggregated signal into a digital pulse stream.

16. The clocking method for a digital radio frequency transmit system of claim 15, wherein the local PLL receives the reference signal $F_{chip\_ref}$ from the master PLL and generates a bitstream frequency $F_{bitstream}$ for clocking control of the bitstream generator in the digital signal processing unit.

17. The clocking method for a digital radio frequency transmit system of claim 15, wherein the bitstream generator is configured for sending the digital pulse stream to the digital predriver utilizing i parallel lanes, each of the i parallel lanes having a rate equal to $$\frac{F_{bitstream}}{i}.$$

18. The clocking method for a digital radio frequency transmit system of claim 17, wherein the digital predriver includes:
n D flip-flops for receiving each particular parallel lane of the i parallel lanes, each of the n D flip-flops corresponding to a particular parallel lane being clocked by $$\frac{360°}{n}$$

phase of $$\frac{F_{bitstream}}{i},$$

and the n D flip-flops corresponding to that particular parallel lane are configured for providing n possible candidate output each with a different adjustable delay;
a phase selector circuit for selecting an output for each particular parallel lane of the i parallel lanes; and
a D flip-flop for resynchronizing the selected output from each of the i parallel lanes and providing a resynchronized bitstream;
wherein the bitstream frequency $F_{bitstream}$ provided by the master PLL is utilized for clocking control of the n D flip-flops corresponding to each of the i parallel lanes, the phase selector circuit and the D flip-flop for bitstream resynchronization.

19. The clocking method for a digital radio frequency transmit system of claim 18, wherein the bitstream generator is configured for sending the digital pulse stream to the digital predriver utilizing 2 parallel lanes, and each of the 2 parallel lanes corresponds to 8 D flip-flops located in the digital predriver.

20. The digital radio frequency transmit system of claim 15, wherein aggregation of multiple complex baseband channels further comprises:
multiplying complex baseband signals by a complex frequency generated in a high-resolution Numerically-Controlled Oscillator; and
assigning the complex baseband signals to desired frequency slots, wherein a frequency offset $\Delta f$ is introduced to the Numerically-Controlled Oscillator to shift the upconverted aggregated baseband signal to coincide with a carrier frequency $F_{carrier}$.

* * * * *